(12) United States Patent
Diard (10) Patent No.: US 8,984,167 B1
(45) Date of Patent: Mar. 17, 2015

(54) REAL-TIME FRAME STREAMING FROM REMOTE GRAPHICS PROCESSING UNIT

(75) Inventor: Franck Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1461 days.

(21) Appl. No.: 12/635,595

(22) Filed: Dec. 10, 2009

(51) Int. Cl.
  *G06F 15/16* (2006.01)
  *H04L 29/06* (2006.01)

(52) U.S. Cl.
  CPC .................................. *H04L 69/04* (2013.01)
  USPC ........................ 709/247; 709/206; 370/241

(58) Field of Classification Search
  CPC .................................................. G09G 2340/02
  USPC ....................................................... 709/247
  See application file for complete search history.

(56) References Cited

U.S. PATENT DOCUMENTS

| | | | |
|---|---|---|---|
| 6,526,163 B1 * | 2/2003 | Halmann et al. | 382/128 |
| 6,633,613 B1 * | 10/2003 | Houlberg | 375/240.26 |
| 2004/0190617 A1 * | 9/2004 | Shen et al. | 375/240.16 |
| 2007/0103590 A1 * | 5/2007 | Azar et al. | 348/459 |
| 2007/0124474 A1 * | 5/2007 | Margulis | 709/226 |
| 2007/0189603 A1 * | 8/2007 | Kasperkiewicz et al. | 382/162 |
| 2007/0291774 A1 * | 12/2007 | Herz et al. | 370/401 |
| 2008/0278595 A1 * | 11/2008 | Schmit et al. | 348/222.1 |
| 2008/0285444 A1 * | 11/2008 | Diab et al. | 370/230.1 |
| 2009/0160865 A1 * | 6/2009 | Grossman | 345/502 |
| 2009/0207178 A1 * | 8/2009 | Azar et al. | 345/502 |
| 2009/0278842 A1 * | 11/2009 | Peterfreund | 345/419 |
| 2009/0296815 A1 * | 12/2009 | Ngan et al. | 375/240.16 |
| 2009/0305790 A1 * | 12/2009 | Lu et al. | 463/42 |
| 2010/0013839 A1 * | 1/2010 | Rawson | 345/502 |
| 2010/0063992 A1 * | 3/2010 | Ma et al. | 709/203 |

* cited by examiner

*Primary Examiner* — Brian P Whipple
(74) *Attorney, Agent, or Firm* — Patterson & Sheridan, LLP (57) ABSTRACT

A client computing device transmits commands and/or data to a software application executing on a server computing device. The server computing device includes one or more graphics processing units (GPUs) that render frames of graphic data associated with the software application. For each frame, the one or more GPUs copy the frame to memory. A server engine also executing on the server computing device divides the frame into subframes, compresses each subframe, and transmits compressed subframes to the client computing device. The client computing device decompresses and reassembles the frame for display to an end-user of the client computing device.

20 Claims, 7 Drawing Sheets

REAL-TIME FRAME STREAMING FROM REMOTE GRAPHICS PROCESSING UNIT

BACKGROUND OF THE INVENTION

1. Field of the Invention

Embodiments of the present invention relate generally to displaying video content, and, more specifically, to real-time frame streaming from a remote graphics processing unit.

2. Description of the Related Art

Some computer systems operate according to a "client-server" computing model, whereby a client computing device interacts with a server computing device across a network. The client computing device may transmit commands and/or data to the server computing device for processing. The server computing device processes the received commands/data, and then transmits processed data back to the client computing device. By implementing this computing model, the client computing device offloads processing operations onto the server computing device.

For example, the client computing device could transmit commands to the server computing device that cause the server computing device to decode and render frames of video data associated with a digital video disc (DVD). The server computing device could then transmit a sequence of rendered frames to the client computing device. The client computing device could display these frames to an end-user via a display device. In this fashion, the processing operations associated with playing the DVD are offloaded onto the server computing device, thereby reducing the processing power required by the client computing device to play the DVD.

Figure 1:
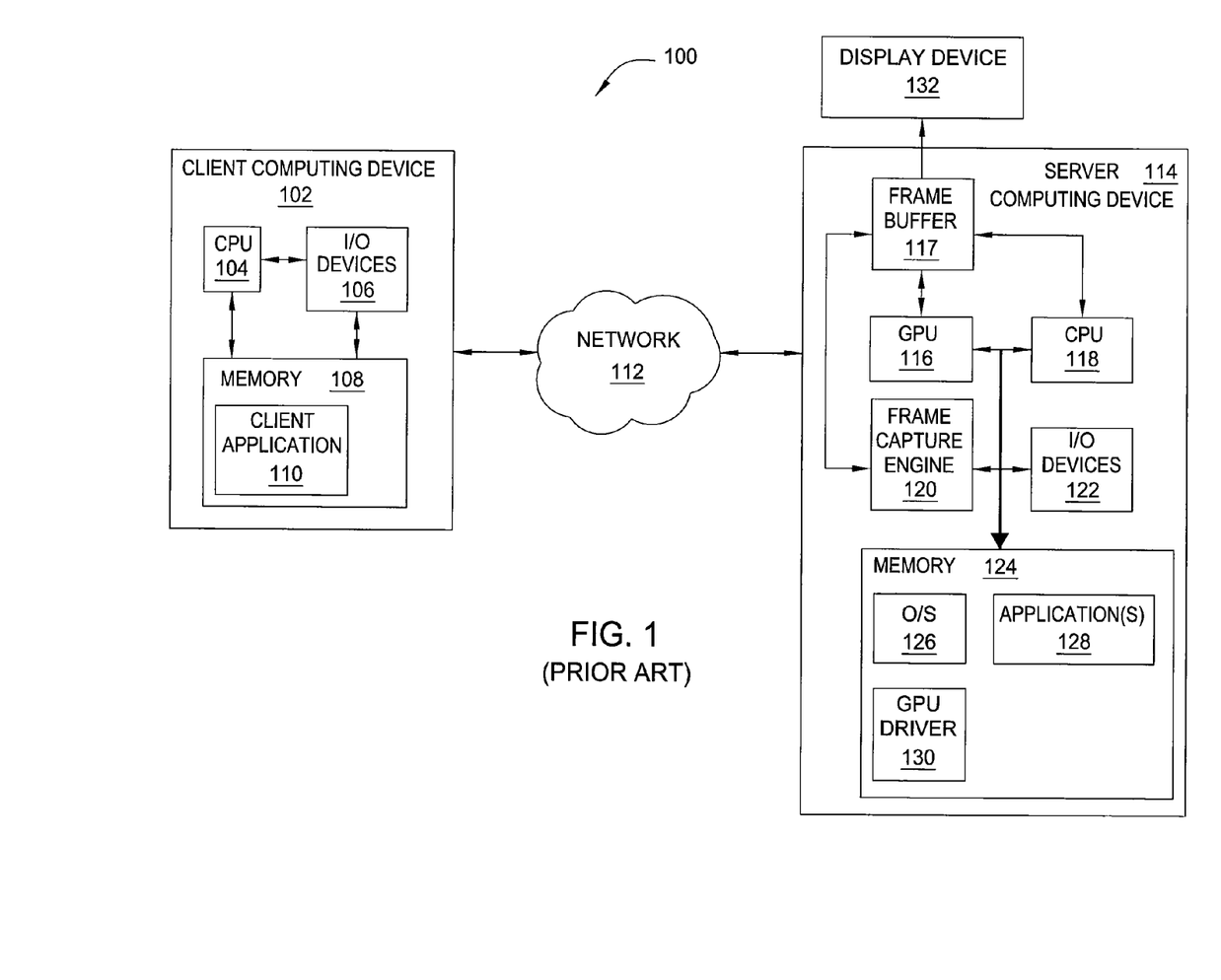
FIG. 1 illustrates client-server computer system, according to the prior art.

A conventional client-server computing model is implemented by software and/or hardware that coordinates data communication between the client device and the server device. FIG. 1 illustrates a prior art client-server computer system 100 configured to coordinate client-server data communication.

As shown, FIG. 1 includes a client computing device 102 in data communication with a server computing device 114 via a network 112. The client computing device 102 includes a central processing unit 104, one or more input/output (I/O) devices 106, and a memory 108. The memory 108 includes a client application 110 that, when executed by the CPU 104, communicates with the server computing device 114 via the network 112.

The server computing device 114 is coupled to a display device 132 and includes a graphics processing unit (GPU) 116, a frame buffer 117, a CPU 118, a frame capture engine 120, one or more I/O devices 122, and a memory 124. The memory 124 includes an operating system 126, one or more applications 128, and a GPU driver 130. The CPU 118 may execute the O/S 126 and the applications 128. The applications 128 may include, for example, a DVD player application. The CPU 118 is configured to execute the GPU driver 130 in order to cause the GPU 116 to render frames of graphic data, or "frames," for display on the display device 132. The frames may be, e.g., frames of a DVD associated with a DVD player application. The GPU 116 renders each new frame to the frame buffer 117. When the display device 132 refreshes, a display driver (not shown) drives a newly-rendered frame from the frame buffer 117 to the display device 132.

The frame capture engine 120 is a hardware unit configured to capture frames rendered by the GPU 116 for transmission to the client computing device 102. When the GPU 116 renders a new frame to the frame buffer, the frame capture engine 120 copies the newly-rendered frame from the frame buffer 117 and transmits that frame to the client computing device 102. Through this technique, the frame capture engine 120 may stream frames of graphic data to the client computing device 102 for display, storage, etc. This technique works well when the GPU 116 can render each new frame to the frame buffer 117 sufficiently in advance of the time when the display device 132 requires the newly rendered frame to be displayed.

However, in certain situations, the GPU 116 requires almost all of the time between refreshes of the display device 132 to render each frame. In these situations, the frame capture engine 120 does not have sufficient time to copy newly-rendered frames before the display device 132 requires those frames. The frame capture engine 120 may thus be unable to capture every frame rendered by the GPU 116, thereby reducing the number of frames that are transmitted to the client computing device 102. Consequently, the frame rate of the frames displayed by the client computing device 102 is reduced.

Figure 2:
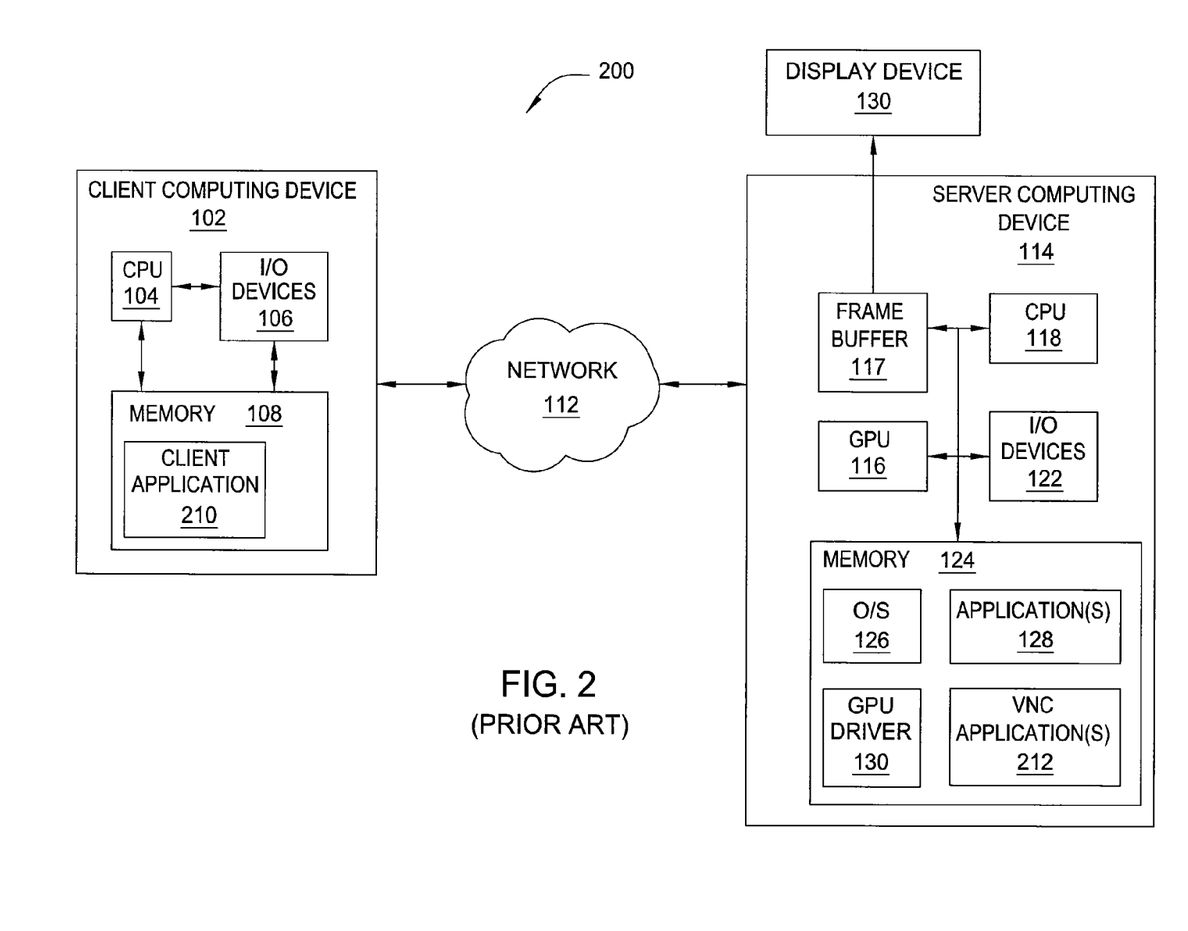
FIG. 2 illustrates another client-server computer system, according to the prior art.

Another prior art client-server computer system 200 is illustrated in FIG. 2. As shown, client-server computer system 200 includes some of the same components as client-server computer system 100. In addition, client-server computer system 200 also includes a virtual network computing (VNC) application 212 within the memory 124 of the server computing device 114. The VNC application 212 is a third-party application that communicates with the O/S 126 via application programming interfaces (APIs), e.g., OpenGL APIs, that allow the VNC application 212 to request newly-rendered frames from the GPU 116 via the O/S 126. When the VNC application 212 requests a newly-rendered frame, the O/S 126 causes the GPU driver 130 to insert a "copy" command into a command buffer associated with the GPU 116. When the GPU 116 receives the copy command, the GPU 116 copies a newly-rendered frame from the frame buffer 117 to the memory 124. The VNC application 212 may then transmit the frame from the memory 124 to the client computing device 102.

One drawback of inserting the copy command into the command buffer, as described, is that the GPU 116 must execute all of the commands already included in the command buffer before executing the copy command. In situations where the GPU command buffer includes a sequence of commands associated with a sequence of frames, the VNC application 212 must wait for those commands to be executed before a frame can be copied to the memory 124. Consequently, frames streamed by the VNC application 212 to the client computing device 102 may be delayed as a result of pre-existing commands in the command buffer. When those frames are associated with an interactive application, such as, e.g., a video game or a virtual desktop application, interaction with that application may be difficult or impossible.

As the foregoing illustrates, what is needed in the art is an improved technique for streaming frames of video content to a client computing device.

SUMMARY OF THE INVENTION

Embodiments of the invention provide a method for streaming frames of graphics data from a server computing device to a client computing device. The method includes causing a discrete graphics processing unit (dGPU) included within the server computing device to render a frame of graphics data associated with a software application executing on the server computing device; causing a copy engine within the dGPU to copy the frame of graphics data to a memory associated with the server computing device; generating a set of compressed subframes based on the frame of graphics data; and transmitting each compressed subframe in the set of compressed subframes to the client computing device across a different data connection between the server computing device and the client computing device.

Advantageously, the GPU driver causes the dGPU to copy every frame that is rendered by the dGPU to memory, thereby avoiding latencies involved with separate (i.e., third-party) software and hardware frame capture techniques. Accordingly, frames of graphic data can be streamed to a client computing device without decreasing the frame rate of that graphic data and without incurring significant delays.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 3:
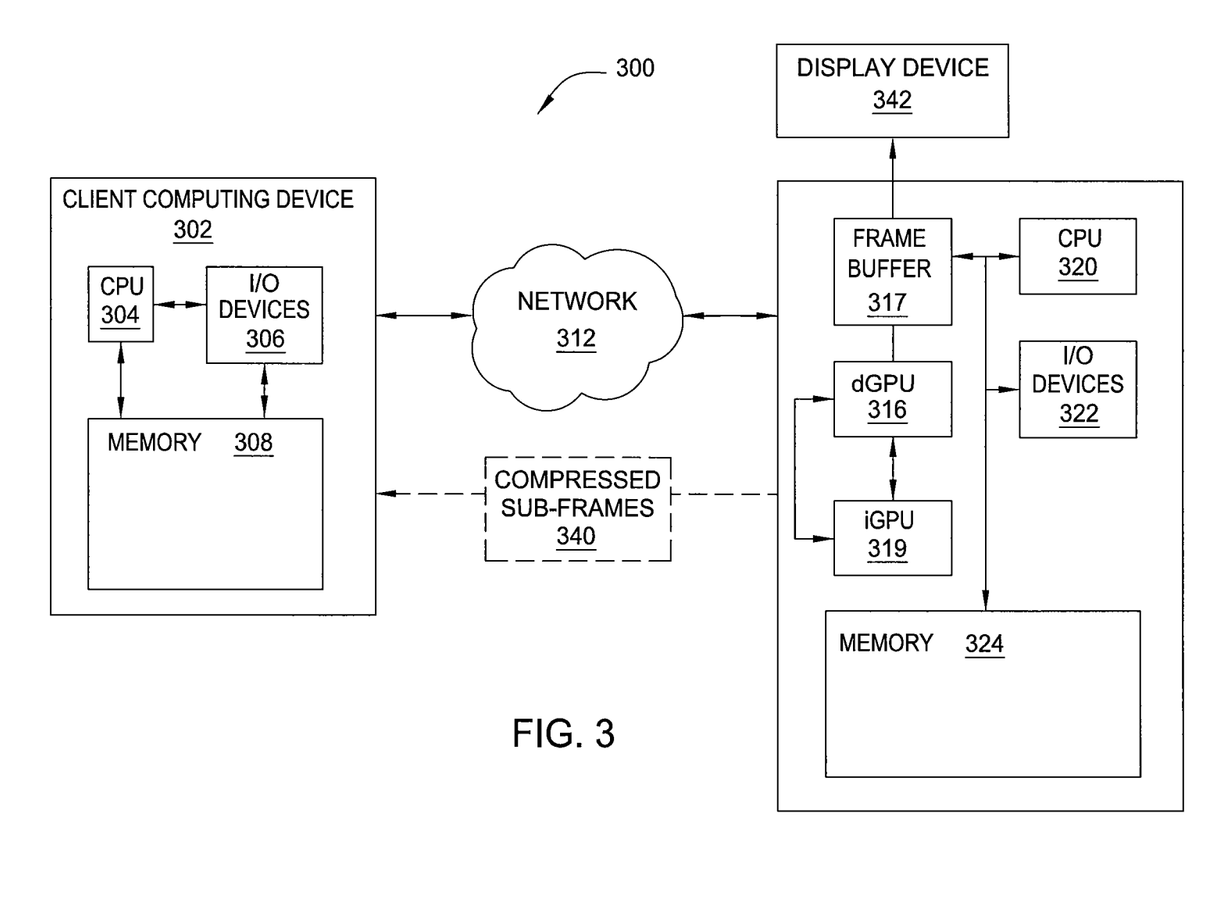
FIG. 3 illustrates a computer system configured to implement one or more aspects of the present invention.

FIG. 3 illustrates a computer system 300 configured to implement one or more aspects of the present invention. The computer system 300 operates in accordance with a client-server computing model, whereby an end-user inputs commands and data to a client computing device 302. The client computing device 302 transmits those commands to a server computing device 314 and the server computing device 314 performs processing operations based on those commands to generate a frame of graphic data. The server computing device 314 generates one or more compressed subframes 340 based on the frame of graphic data and transmits the compressed subframes 340 to the client computing device 302. The client computing device 302 re-creates the frame of graphic data based on the compressed subframes 340 and then displays the frame of graphic data to the end-user.

As shown, the computer system 300 includes the client computing device 302 coupled to the server computing device 314 via a network 312. The network 312 may be any type of network that allows data to be transferred between the client computing device 302 and the server computing device 314, including a local area network (LAN), a wide-area network (WAN), a wireless (WiFi) network, an Ethernet network, a cellular network, and so forth.

The client computing device 302 may be a laptop computing device, a desktop computing device, a mobile computing device, or any other type of computing device. The client computing device 302 is configured to transmit commands and/or data to the server computing device 314 via the network 312 and to receive data from the server computing device 314 via the network 312. The client computing device 302 includes a central processing unit (CPU) 304, one or more input/output (I/O) devices 306, and a memory 308.

The I/O devices 306 include input devices, such as a keyboard, a mouse, or a joystick, among others, as well as output devices, such as a display device or a speaker, among others. The I/O devices 306 may also include devices configured to receive input and transmit output, such as an Ethernet port, a wireless card, or a touchscreen, among others devices. In one embodiment, the I/O devices 306 provide a data connection between the client computing device 302 and the server computing device 314. The I/O devices 306 may also transmit data to and receive data from the memory 308 and/or the CPU 304.

The CPU 304 may be an application-specific integrated circuit (ASIC), a field-programmable gate array (FPGA), a graphics processing unit (GPU), or any other type of processing unit. The CPU 304 is configured to execute software applications corresponding to a particular instruction set architecture (ISA) associated with the CPU 304. The software applications may be received from the I/O devices 306 and/or retrieved from the memory 308, among other places.

The memory 308 may be any type of memory unit, including a random-access memory (RAM) unit, a read-only memory (ROM) unit, a flash memory unit, and so forth. As described in greater detail in conjunction with FIG. 4, the memory 308 includes a "remote access application" that, when executed by the CPU 304, receives commands from an end-user via the I/O devices 306 and transmits those commands to a "server engine" within the server computing device 314. The commands may be used to interact with a software program executing on the server computing device 314. The server engine routes the commands to the software program, which may then cause frames of graphic data to be generated based on the received commands. The frames of graphic data could be associated with, for example, a digital video disk (DVD), a video game application, or a graphical user interface (GUI), among others. The server engine streams the frames of graphic data to the client computing device 302 as compressed subframes 340.

The server computing device 314 may be a laptop computing device, a desktop computing device, a mobile computing device, or any other type of computing device. The server computing device 314 includes a discrete graphics processing unit (dGPU) 316, a frame buffer 317, an integrated GPU (iGPU) 319, a CPU 320, one or more I/O devices 322, and a memory 324. The I/O devices 320 may include substantially similar input and/or output devices as those included in the I/O devices 306. The I/O devices 320 are configured to transmit data to and receive data from the memory 324, the CPU 320, the dGPU 316, and/or the iGPU 319.

The dGPU 316 and the iGPU 319 are co-processors configured to cooperate to perform graphics processing operations. In one embodiment, the dGPU 316 performs graphics-intensive graphics processing operations, while the iGPU 319 performs nominally-intensive graphics processing operations. Either the dGPU 316 or the iGPU 319 may render frames of graphic data (referred to hereinafter as "frames") to the frame buffer 317 for display on the display device 342. The frame buffer 317 may include two or more separate buffers between which the dGPU 316 alternates when rendering frames. As described in greater detail in conjunction with FIG. 4, the dGPU 316 may render frames to the frame buffer 317 and then (i) perform further processing operations on those frames or (ii) copy the frames to the iGPU 319 for further processing. The CPU 320 may also perform processing operations with frames rendered by the dGPU 316.

The CPU 320 may be an ASIC, an FPGA, a GPU, or any other type of processing unit. In one embodiment, the CPU 320 is a multi-core processing unit. The CPU 320 is configured to execute one or more drivers associated with the dGPU 316 and/or the iGPU 319 in order to coordinate the operations of the dGPU 316 and/or the iGPU 319, respectively. The CPU 320 is also configured to execute software applications corresponding to a particular ISA associated with the CPU 320. The software applications may be stored in the memory 324, among other places.

The memory 324 may be any type of memory unit, including a RAM unit, a ROM unit, a flash memory unit, and so forth. A software program stored in the memory 324 may be executed by the CPU 320 to establish one or more transmission control protocol/internet protocol (TCP/IP) connections with client computing device 302. The TCP/IP connections are established across the network 312. The software program may also be executed by the CPU 320 to divide frames rendered by the dGPU 316 into subframes, compresses those subframes into compressed subframes 340, and then transmit the compressed subframes 340 to the client computing device 302 via the TCP/IP connections, as described in greater detail below in conjunction with FIG. 4.

Figure 4:
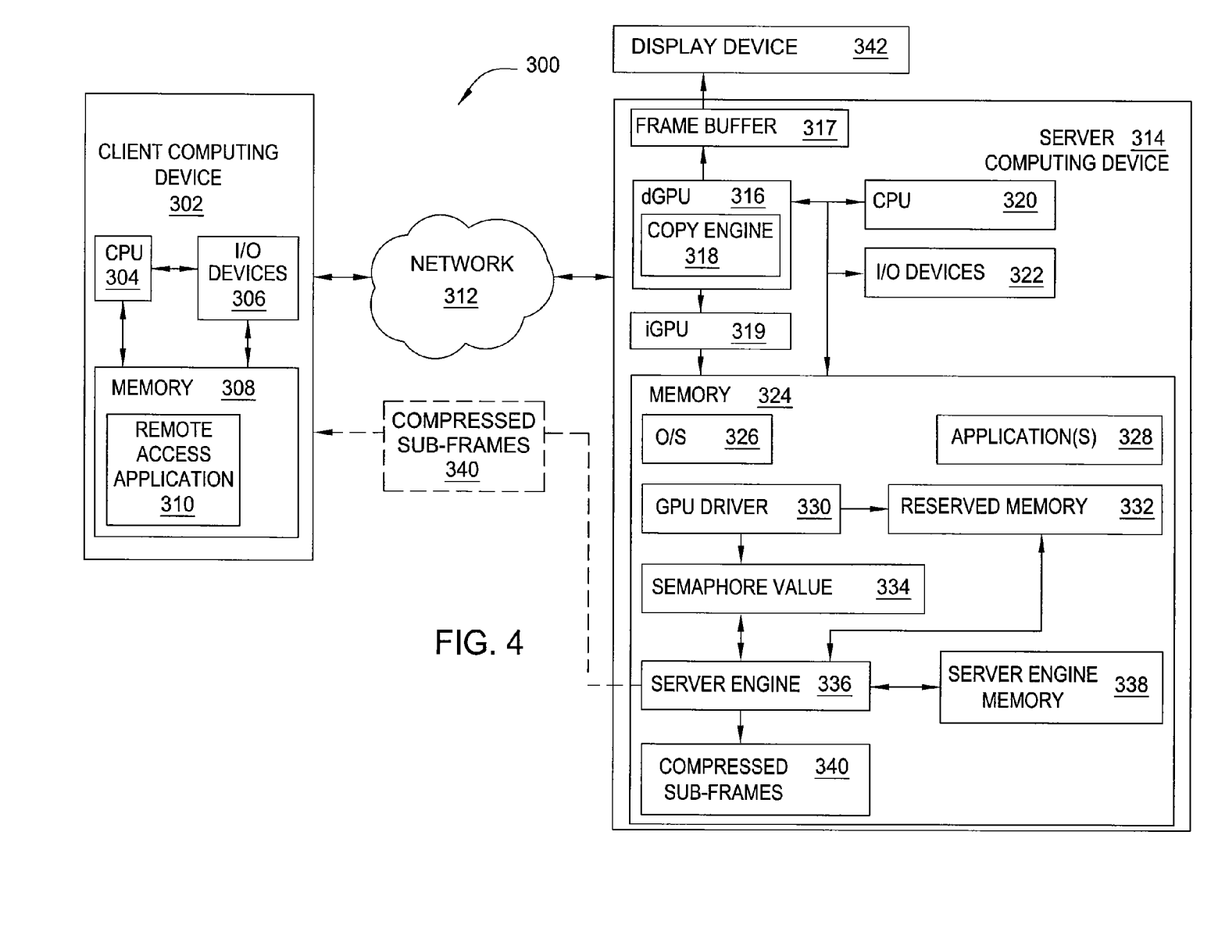
FIG. 4 illustrates the computer system of FIG. 3 in greater detail, according to one embodiment of the invention.

FIG. 4 illustrates the computer system 300 of FIG. 3 in greater detail, according to one embodiment of the invention. As shown, the computer system 300 includes the same components as those shown in FIG. 3. In addition, the memory 308 of the client computing device 302 includes a remote access application 310 that is configured to communicate with a server engine 336 included within the memory 324 of the server computing device 314.

When executed by the CPU 304, the remote access application 310 transmits an initialization packet to the server engine 336. The initialization packet includes data specifying an application 328 to be executed on the server computing device 314.

In response to receiving the initialization packet, the server engine 336 transmits a configuration packet to the remote access application 310 that includes metadata specifying a compression algorithm used to generate the compressed subframes 340 as well as a number of subframes per frame. As discussed in conjunction with FIG. 3, the server engine 336 also establishes one or more TCP/IP connections with the client computing device 302 across which the compressed subframes 340 are to be transmitted. The server engine 336 establishes a number of TCP/IP connections that is equal to the number of subframes per frame.

In addition to the server engine 336, the server computing device 314 shown in FIG. 4 also includes an operating system (O/S) 326, the application(s) 328, a GPU driver 330, reserved memory 332, a semaphore value 334, a server engine memory 338, and the compressed subframes 340 within the memory 324. The O/S 326 is a software program that can be executed by the CPU 320 to coordinate the operations of other software applications executed by the CPU 320. The O/S 326 may be any type of operating system, including Windows® or Mac OSX® operating system, among others.

The applications 328 are software programs that can be executed by CPU 320 to perform a wide variety of processing and/or input/output tasks. For example, the applications 328 may include video game applications, video player applications, computer-aided design (CAD) applications, simulation applications, or integrated development environment (IDE) applications, or other graphics-oriented applications. The applications 328 may offload graphics processing tasks to the dGPU 316 and/or the iGPU 319 in order to expedite the performance of these operations. For example, one of the applications 328 could be a video game application that offloads rendering tasks to the dGPU 316. The dGPU 316 could render each frame and then cause the display device 342 to display the rendered frame. The applications 328 offload graphics processing operations to the dGPU 316 and to the iGPU 319 by transmitting those operations to the GPU driver 330 via the O/S 326.

The GPU driver 330 is a software program that, when executed by the CPU 320, transmits hardware (HW) commands to the dGPU 316 and/or the iGPU 319. In response to graphics processing operations received from the applications 328, the dGPU 316 and/or the iGPU 319 may perform a wide variety of operations, including graphics-related processing operations, general processing operations, and power regulation operations, among others.

In some situations, one of the applications 328 causes the dGPU 316 to render frames for display on the display device 324, as described in the above example. In these situations, the GPU driver 330 transmits HW commands to the dGPU 316 on behalf of the application 328. The HW commands cause the dGPU 316 to (i) render frames to the frame buffer 317 and (ii) copy rendered frames to the reserved memory 332 within memory 324. In one embodiment, the dGPU 316 converts rendered frames from red-green-blue (RGB) format to YUV format and/or scale the converted frames based on a screen resolution associated with client computing device 302.

The dGPU 316 includes a copy engine 318 configured to copy the rendered frames from the frame buffer 317 to the reserved memory 332. The reserved memory 332 resides in kernel space and may be cache-coherent. The reserved memory 332 is initialized by the GPU driver 330 and reserved for storing frames copied from the frame buffer 317. For each frame copied to the reserved memory 332, the dGPU 316 increments the semaphore value 334.

In one embodiment, copy engine 318 copies rendered frames to local memory within the iGPU 319. The iGPU 319 then converts the received frames from RGB format to YUV format and stores the YUV frames in the reserved memory 332. In a further embodiment, the iGPU 319 scales the converted frames based on a screen resolution associated with the client computing device 302.

The server engine 336 monitors the semaphore value 334. When the semaphore value 334 changes (e.g., increments), the server engine 334 copies a frame stored in the reserved memory 332 to the server engine memory 338. When the reserved memory 332 is cache coherent, upon copying the frame to the server engine memory 338, the server engine 336 invalidates a cache line associated with the frame.

The server engine 336 then divides the frame into a number of subframes. The number of subframes may be equal to the number of independent processing cores included within the CPU 320. The server engine 336 executes a compression program on each available processing core of CPU 320 in order to compress each subframe. In one embodiment, the server engine 336 executes on a first processing core of CPU 320 while causing a compression program to execute on each remaining processing core. Each compression program compresses a different subframe. In an exemplary configuration, the CPU 320 includes four processing cores. The server engine 336 executes on a first processing core. When the server engine 336 retrieves a frame from the server engine memory 338, the server engine 336 divides the frame into three subframes and executes a compression program on each of the three available processing cores with a different subframe. In this fashion, the server engine 336 generates the compressed subframes 340. The server engine 340 then transmits each compressed subframe 340 to the remote access application 310 via a different TCP/IP connection.

The remote access application 310 receives the compressed subframes 340 from the server engine 336 and then decompresses each of the compressed subframes 340. The remote access application 310 then merges the decompressed subframes to generate a frame. The frame can be displayed on a display device (e.g., included within the I/O devices 306) and/or stored in the memory 308. The client computing device 302 may then receive additional data and/or commands from the end-user for transmission to the server engine 336.

In this manner, the end-user of the client computing device 302 may interact with one of the applications 328 that execute on the server computing device 314. The end-user may input commands to the client computing device 302, which then receives frames of graphic data generated by the application 328 in response to those commands. Since the GPU driver 330 causes the copy engine 318 to copy each rendered frame of data to the memory 324, latencies involved with separate hardware units, as described in FIG. 1, and latencies involved with third-party applications, as described in FIG. 2, can be avoided.

Figure 5:
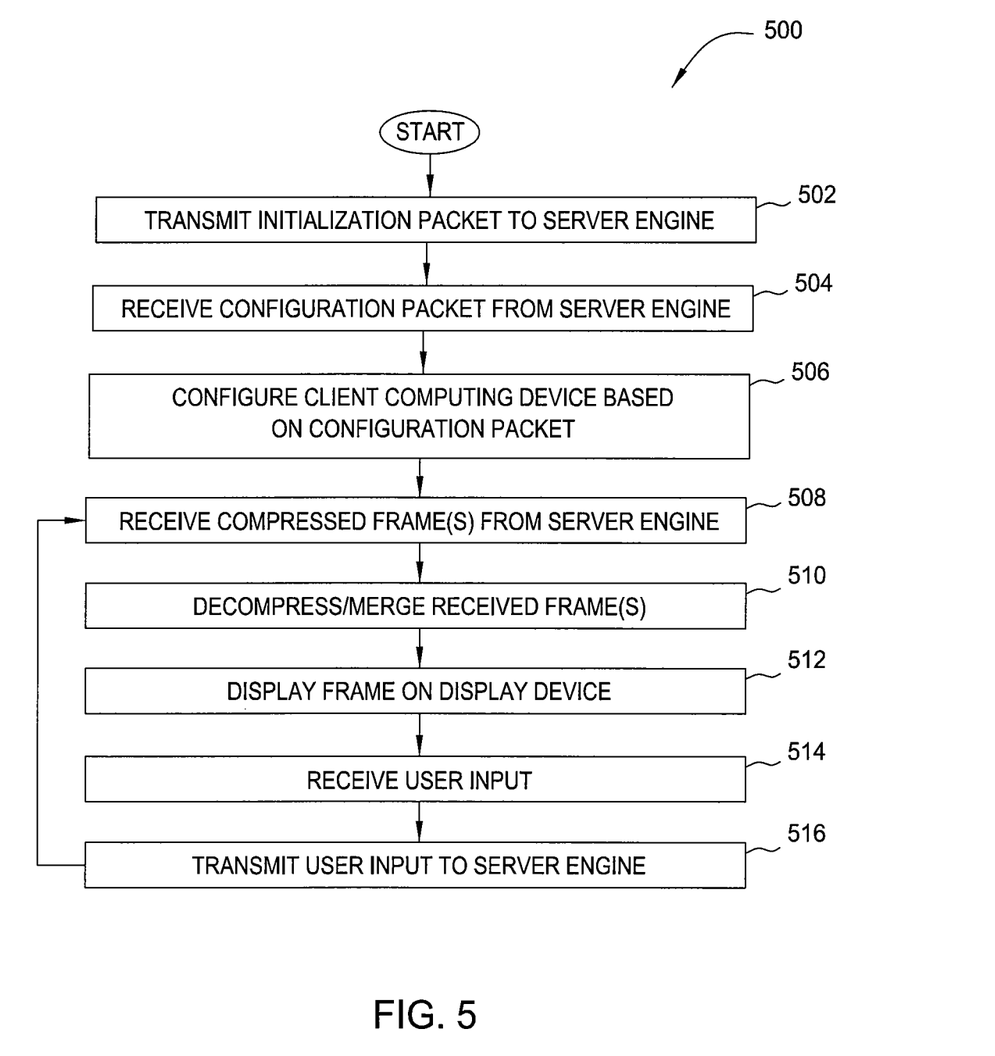
FIG. 5 is a flowchart of method steps for capturing a frame of graphic data, according to one embodiment of the invention.

FIG. 5 is a flowchart of method steps for capturing a frame of graphic data, according to one embodiment of the invention. Although the method steps are described in conjunction with the systems of FIGS. 3-4, persons skilled in the art will understand that any system configured to perform the method steps, in any order, is within the scope of the invention. The method 500 is implemented by the remote access application 310 when the remote access application 310 is executed by the CPU 304.

As shown, the method 500 begins at step 502, where the remote access application 310 transmits an initialization packet to the server engine 336. The initialization packet includes data specifying a particular application 328 to be executed on the server computing device 314. At step 504, the remote access application 310 receives a configuration packet from the server engine 336. The configuration packet includes data specifying a compression algorithm used to generate compressed subframes 340 and the number of subframes per frame. At step 506, the remote access application 310 configures the client computing device 310 based on the received configuration packet. The remote access application 310 may use data included in the configuration packet when establishing data communication with the server engine 336 and/or when decompressing and reassembling a frame from the compressed subframes 340.

At step 508, the remote access application 310 receives one or more compressed subframes 340 from the server engine 336. Each compressed subframe 340 represents a different portion of a single frame. Additionally, each compressed subframe is transmitted across a different TCP/IP connection between the server computing device 314 and the client computing device 302.

At step 510, the remote access application 310 decompresses the compressed subframes 340 and merges the decompressed subframes into a single frame. At step 512, the remote access application 310 displays the frame on a display device associated with the client computing device 302. The remote access application 310 may also store the frame in the memory 308. At step 514, the remote access application 310 receives input entered by the end-user of the client computing device 302 via the I/O devices 306. The input could be, for example, commands issued to a video game executing on the server computing device 314. At step 5126, the remote access application 310 transmits the user input to the server engine 336. The method then returns to step 508 and proceeds as described above.

The method 500 thus outlines a technique through which an end-user of the client computing device can issue commands to a software application executing on the server computing device 314 and receive frames of graphic data generated based on those commands.

Figure 6:
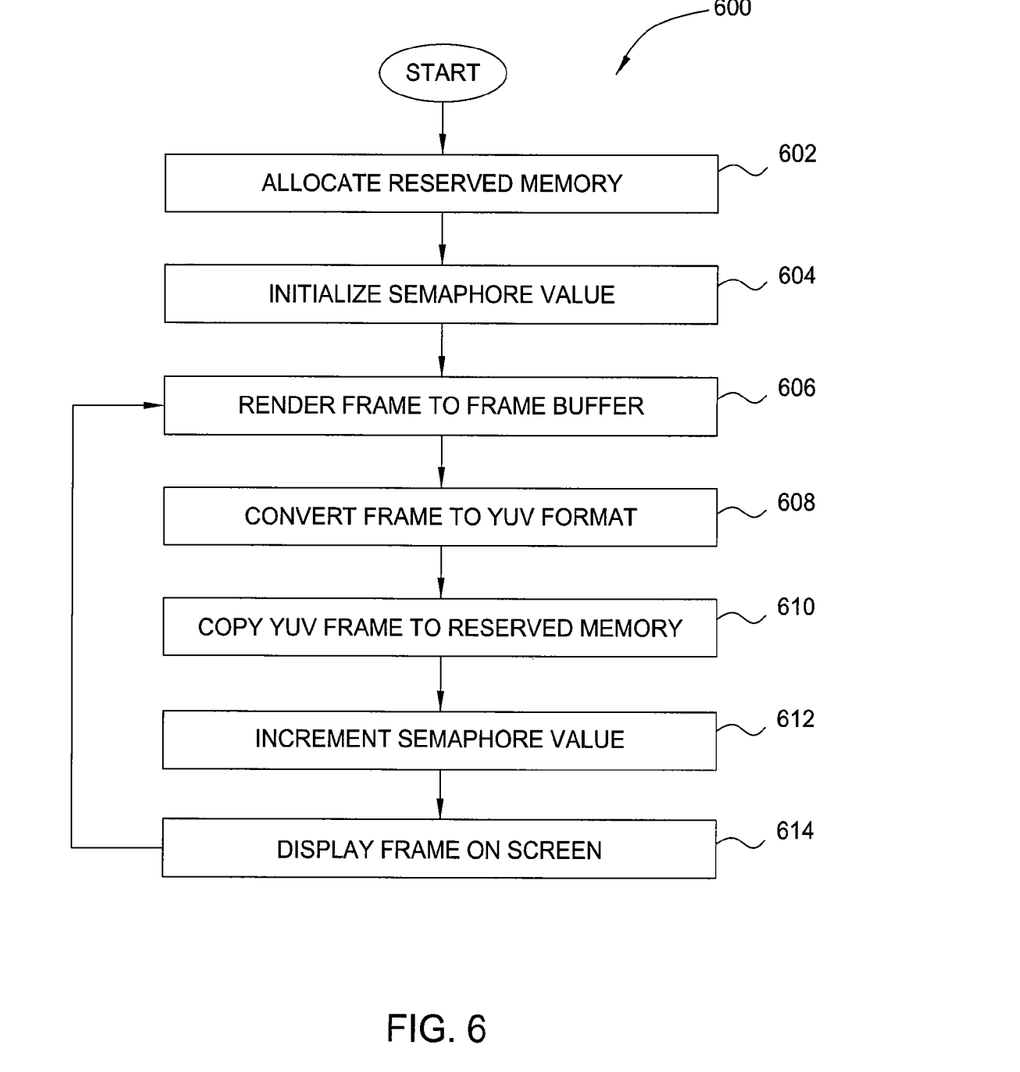
FIG. 6 is a flowchart of method steps for streaming frames of graphic data to a client computing device, according to one embodiment of the invention.

FIG. 6 is a flowchart of method steps for streaming frames of graphic data to a client computing device, according to one embodiment of the invention. Although the method steps are described in conjunction with the systems of FIGS. 3-4, persons skilled in the art will understand that any system configured to perform the method steps, in any order, is within the scope of the invention. The method 600 is implemented by the GPU driver 330 when the GPU driver 330 is executed by the CPU 320.

As shown, the method 600 begins at step 602, where the GPU driver 330 allocates the reserved memory 332 within the memory 324. In one embodiment, the GPU driver 330 allocates 16 MB of cache-coherent memory in kernel space for use as the reserved memory 332. In another embodiment, the O/S 324 allocates the reserved memory 332. At step 604, the GPU driver 330 initializes the semaphore value 334 to zero. At step 606, the GPU driver 330 causes the dGPU 316 to render a frame of graphic data to the frame buffer 317. The frame buffer 317 may include two or more separate buffers. When the frame buffer 317 includes separate buffers, the dGPU 316 alternates between rendering frames to each of the separate buffers. At step 608, the GPU driver 330 causes the dGPU 316 to convert the frame from RGB format to YUV format. In one embodiment, the GPU driver 330 causes the iGPU 316 to perform step 608.

At step 610, the GPU driver 330 causes the copy engine 318 within the dGPU 316 to copy the converted frame to the reserved memory 332. In embodiments where the iGPU 319 converts the frame to YUV format, the GPU driver 330 causes the iGPU 319 to perform step 610. At step 612, the GPU driver 330 increments the semaphore value 334. At step 614, the GPU driver 330 causes the dGPU 316 to drive the newly rendered frame within frame buffer 317 to the display device 342 for display. The method 600 then returns to step 606 and proceeds as described above.

The method 600 thus outlines the technique through which the GPU driver 330 causes the dGPU 316 to copy a newly-rendered frame of graphic data to the memory 324.

Figure 7:
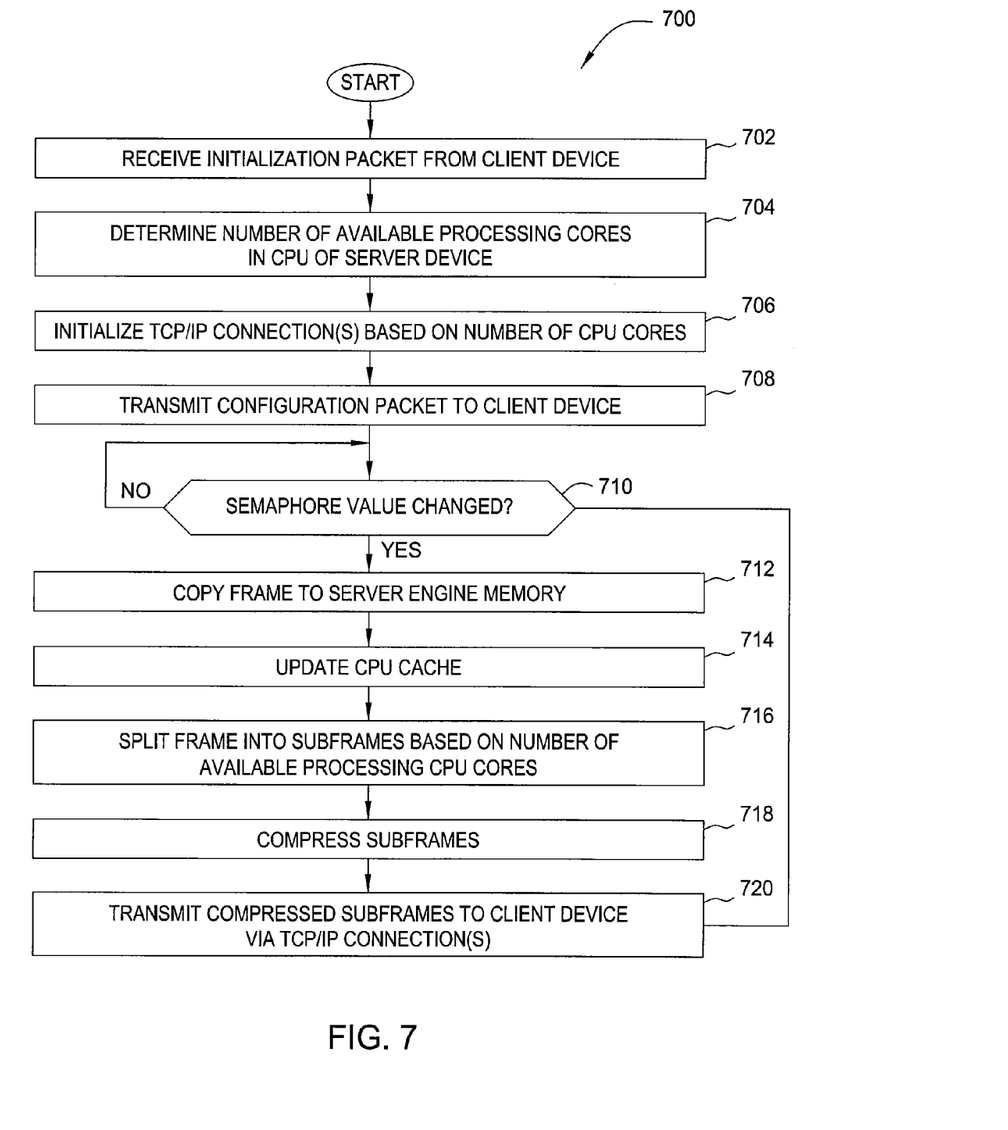
FIG. 7 is a flowchart of method steps for displaying received frames of graphic data, according to one embodiment of the invention.

FIG. 7 is a flowchart of method steps for displaying received frames of graphic data, according to one embodiment of the invention. Although the method steps are described in conjunction with the systems of FIGS. 3-4, persons skilled in the art will understand that any system configured to perform the method steps, in any order, is within the scope of the invention. The method 700 is performed by the server engine 336 when the server engine 336 is executed by the CPU 320.

As shown, the method 320 begins at step 702, where the server engine 336 receives an initialization packet from the remote access application 310. The initialization packet includes data specifying a particular application 328 to be executed on the server computing device 314. At step 704, the server engine 336 determines the number of available processing cores included in the CPU 320. At step 706, the server engine 336 initializes a number of TCP/IP connections with the remote access application 310 based on the number of available processing cores of the CPU 320. At step 708, the server engine 336 transmits a configuration packet to the remote access application 310 within the client computing device 302. The configuration packet specifies a compression algorithm used to compress the compressed subframes 340 as well as the number of subframes associated with each frame.

At step 710, the server engine 336 determines whether the semaphore value 334 has changed (e.g., incremented). The server engine 336 waits until the semaphore value 334 has changed, and then the method 700 proceeds to step 712. At step 712, the server engine 336 copies a frame of graphic data from the reserved memory 332 to the server engine memory 338. At step 714, the server engine 336 updates a cache associated with the CPU 320. The server engine 336 may write the frame to the cache and/or invalidate a cache line within the cache. At step 716, the server engine 336 splits the frame into a number of subframes. In some embodiments, the number of subframes is equal to the number of availability processing cores on the CPU 320. At step 718, the server engine 336 causes the CPU 320 to compress the subframes into the compressed subframes 340. In one embodiment, the server engine 336 executes on one core of the CPU 320, and the server engine causes each of the remaining cores to execute a compression algorithm with a different subframe to generate compressed subframes 340. At step 720, the server engine 336 transmits the compressed subframes 340 to the client computing device 302 across the TCP/IP connections. The method 700 then returns to step 710 and proceeds as described above.

The method 700 thus describes a technique through which frames of graphic data associated with the application 328 can be captured and transmitted to the client computing device 302.

In sum, a graphics processing unit (GPU) driver executing on a server computing device causes a discrete GPU (dGPU) to render frames associated with a software application. The dGPU or an iGPU then processes the rendered frames and copies those frames to memory within the server computing device. For each frame, a server engine divides the frame into subframes. The server engine compresses each subframe and then transmits the subframes to a client computing device. The client computing device executes a remote access application that decompresses the compressed subframes and merges the subframes to re-create the frame. The remote access application then causes the frame to be displayed on a display device associated with the client computing device. The client computing device may then receive commands and/or data from an end-user and transmit the commands and/or data to the software application within the server computing device.

Advantageously, the GPU driver causes the dGPU to copy every frame that is rendered by the dGPU to memory, thereby avoiding latencies involved with separate (i.e., third-party) software and hardware frame capture techniques. Accordingly, frames of graphic data can be streamed to a client computing device without decreasing the frame rate of that graphic data and without incurring significant delays.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for streaming frames of graphics data from a server computing device to a client computing device, comprising:
   causing a discrete graphics processing unit (dGPU) included within the server computing device to render a frame of graphics data associated with a software application executing on the server computing device;
   causing a copy engine within the dGPU to copy the frame of graphics data to a memory associated with the server computing device;
   generating a set of compressed subframes based on the frame of graphics data; and
   transmitting each compressed subframe in the set of compressed subframes to the client computing device across a different data connection between the server computing device and the client computing device.

2. The method of claim 1, wherein the step of generating the set of compressed subframes comprises:
   dividing the frame of graphics data into a number of subframes that is based on the number of available processing cores within the server computing device; and
   causing each subframe to be compressed within a different available processing core.

3. The method of claim 1, further comprising the step of causing the dGPU or an integrated graphics processing unit (iGPU) also included within the server computing device to convert the frame of graphics data from a red-green-blue (RGB) format to a YUV format prior to the step of generating the set of compressed subframes.

4. The method of claim 1, further comprising the step of causing the dGPU or an iGPU also included within the server computing device to scale the frame of graphics data based on a screen resolution associated with the client computing device prior to the step of generating the set of compressed subframes.

5. The method of claim 1, further comprising the step of establishing a number of different data connections between the server computing device and the client computing device equal to the number of available processing cores.

6. The method of claim 1, wherein each of the different data connections between the server computing device and the client computing device comprises a transfer control protocol/internet protocol (TCP/IP) data connection.

7. The method of claim 1, further comprising the steps of:
   receiving the set of compressed subframes from the server computing device;
   decompressing each compressed subframe in the set of compressed subframes to generate a set of decompressed subframes;
   merging the decompressed subframes to generate a recreated frame of graphics data that is substantially similar to the frame of graphics data; and
   displaying the recreated frame of graphics data on a display device associated with the client computing device.

8. A non-transitory computer-readable storage medium storing instructions that, when executed by a processor, cause frames of graphics data to stream from a server computing device to a client computing device, by performing the steps of:
   causing a discrete graphics processing unit (dGPU) included within the server computing device to render a frame of graphics data associated with a software application executing on the server computing device;
   causing a copy engine within the dGPU to copy the frame of graphics data to a memory associated with the server computing device;
   generating a set of compressed subframes based on the frame of graphics data; and
   transmitting each compressed subframe in the set of compressed subframes to the client computing device across a different data connection between the server computing device and the client computing device.

9. The computer-readable storage medium of claim 8, wherein the step of generating the set of compressed subframes comprises:
   dividing the frame of graphics data into a number of subframes that is based on the number of available processing cores within the server computing device; and
   causing each subframe to be compressed within a different available processing core.

10. The computer-readable storage medium of claim 8, further comprising the step of causing the dGPU or an integrated graphics processing unit (iGPU) also included within the server computing device to convert the frame of graphics data from a red-green-blue (RGB) format to a YUV format prior to the step of generating the set of compressed subframes.

11. The computer-readable storage medium of claim 8, further comprising the step of causing the dGPU or an iGPU also included within the server computing device to scale the frame of graphics data based on a screen resolution associated with the client computing device prior to the step of generating the set of compressed subframes.

12. The computer-readable storage medium of claim 8, further comprising the step of establishing a number of different data connections between the server computing device and the client computing device equal to the number of available processing cores.

13. The computer-readable storage medium of claim 8, wherein each of the different data connections between the server computing device and the client computing device comprises a transfer control protocol/internet protocol (TCP/IP) data connection.

14. A system for streaming frames of graphics data, comprising:
   a server computing device including a discrete graphics processing unit (dGPU), the server computing device configured to:
      cause the dGPU to render a frame of graphics data associated with a software application executing on the server computing device,
      cause a copy engine within the dGPU to copy the frame of graphics data to memory associated with the server computing device,
      generate a set of compressed subframes based on the frame of graphics data, and
      transmit each compressed subframe in the set of compressed subframes to the client computing device across a different data connection between the server computing device and the client computing device.

15. The system of claim 14, wherein the step of generating the set of compressed subframes comprises:
   dividing the frame of graphics data into a number of subframes that is based on the number of available processing cores within the server computing device; and
   causing each subframe to be compressed within a different available processing core.

16. The system of claim 14, wherein the server computing device is further configured to cause the dGPU or an integrated graphics processing unit (iGPU) also included within the server computing device to convert the frame of graphics data from a red-green-blue (RGB) format to a YUV format prior to the step of generating the set of compressed subframes.

17. The system of claim 14, wherein the server computing device is further configured to cause the dGPU or an iGPU also included within the server computing device to scale the frame of graphics data based on a screen resolution associated with the client computing device prior to the step of generating the set of compressed subframes.

18. The system of claim 14, wherein the server computing device is further configured to establish a number of different data connections between the server computing device and the client computing device equal to the number of available processing cores.

19. The system of claim 14, wherein each of the different data connections between the server computing device and the client computing device comprises a transfer control protocol/internet protocol (TCP/IP) data connection.

20. The system of claim 14, wherein the client computing device is configured to:
   receive the set of compressed subframes from the server computing device;
   decompress each compressed subframe in the set of compressed subframes to generate a set of decompressed subframes;
   merge the decompressed subframes to generate a recreated frame of graphics data that is substantially similar to the frame of graphics data; and
   display the recreated frame of graphics data on a display device associated with the client computing device.

* * * * *